(12) United States Patent
Ishida (10) Patent No.: US 6,579,508 B2
(45) Date of Patent: Jun. 17, 2003

(54) METHOD FOR CONTROLLING ABSORBENT AT DECARBOXYLATION FACILITY AND SYSTEM THEREFOR

(75) Inventor: Kazuo Ishida, Chiyoda-ku (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 72 days.

(21) Appl. No.: 09/801,814

(22) Filed: Mar. 9, 2001

(65) Prior Publication Data

US 2001/0021362 A1 Sep. 13, 2001

(30) Foreign Application Priority Data

Mar. 10, 2000 (JP) ........................ 2000-065925

(51) Int. Cl.[7] ........................ B01D 53/62; G05D 23/00
(52) U.S. Cl. ........................ 423/220; 423/228; 423/229; 423/DIG. 5; 423/DIG. 6; 422/106; 422/108
(58) Field of Search ........................ 422/106, 108; 423/220, 228, 229, DIG. 5, DIG. 6

(56) References Cited

U.S. PATENT DOCUMENTS

| | | | |
|---|---|---|---|
| 4,075,293 A | * 2/1978 | Grill et al. | 261/20 |
| 4,491,566 A | 1/1985 | Adams et al. | 423/220 |
| 4,719,088 A | * 1/1988 | Itoh et al. | 422/106 |
| 5,085,839 A | 2/1992 | Scott et al. | 423/210 |
| 5,318,758 A | 6/1994 | Fujii et al. | 423/228 |
| 6,017,501 A | * 1/2000 | Waycuilis | 423/220 |

FOREIGN PATENT DOCUMENTS

JP    10 165761    6/1998

* cited by examiner

Primary Examiner—Stanley S. Silverman
Assistant Examiner—Timothy C. Vanoy
(74) Attorney, Agent, or Firm—Oblon, Spivak, McClelland, Maier & Neustadt, P.C.

(57) ABSTRACT

A method for controlling absorbent at a decarboxylation facility with an absorption tower having an amine recovery section and a regeneration tower, including controlling a temperature controller for controlling a temperature of circulating water forwarded to the amine recovery section of the absorption tower by a controller which controls a liquid level at the bottom of the absorption tower, whereby the concentration of amine in the absorbent is regulated.

7 Claims, 8 Drawing Sheets

METHOD FOR CONTROLLING ABSORBENT AT DECARBOXYLATION FACILITY AND SYSTEM THEREFOR

BACKGROUND OF THE INVENTION

Field of the Invention

The present invention relates to a method for controlling absorbent at a decarboxylation facility and a system therefor.

In recent years, at thermal electric power plants and boiler plants, a large amount of coal, heavy oil, or superheavy oil has been used as a fuel, so that the control of the quantity and concentration of discharged sulfur oxides mainly consisting of sulfur dioxide, nitrogen oxides, carbon dioxide, and the like has posed a problem from the viewpoint of prevention of air pollution and cleanness of global environment. Also, for carbon dioxide, together with flon gas and methane gas, the control of its discharge has been studied form the viewpoint of global warming. Therefore, methods such as a PSA (Pressure Swing Adsorption) method, a membrane separation concentration method, and a reaction absorption method using a basic compound have been studied. U.S. Pat. No. 5,318,758 has disclosed a method for effecting decarboxylation with an amine compound (hereinafter referred simply to as amine) being used as an absorbent. In this method, if the balance between the quantity of water in combustion flue gas flowing into a decarboxylation facility and the quantity of water in absorbent flowing out of the decarboxylation facility together with gas is lost, or amine in absorbent flows out of the decarboxylation facility, the concentration of amine in absorbent is liable to vary. The variations in amine concentration cause variations in the absorption rate of carbon dioxide and steam consumption in a regeneration tower.

Conventionally, in order to make the amine concentration constant, water containing amine is extracted from an overhead drum of the regeneration tower, or the operator regulates the gas temperature at the inlet or outlet of an absorption tower manually to control the water balance. Therefore, the burden on the operator is heavy, and the cost of waste water treatment facility is excessive.

SUMMARY OF THE INVENTION

An object of the present invention is to provide a method for controlling absorbent at a decarboxylation facility, in which water balance is controlled automatically and the concentration of amine is automatically kept proper, and a system for carrying out this method.

To achieve the above object, the present invention provides a method for controlling an absorbent at a decarboxylation facility provided with an absorption tower having an amine recovery section and a regeneration tower, wherein a temperature controller for circulating water to the washing section of the absorption tower is controlled by a controller of the liquid level of the bottom of the absorption tower to control the temperature of the circulating water, thereby the concentration of amine in the absorbent is regulated.

In the present invention, the controller of the liquid level of the bottom of the absorption tower is generally a liquid level controller, which receives liquid level information sent from a liquid level detector and sends a control signal to the temperature controller.

The temperature controller for circulating water to the washing section of the absorption tower is generally a temperature controller, which receives a control signal sent from the controller of the liquid level of the bottom of the absorption tower and changes a temperature set value, and regulates the flow rate by controlling a control valve while detecting temperature information sent from a temperature detector.

Also, the present invention provides, in another embodiment, a method for controlling absorbent at a decarboxylation facility provided with an absorption tower having an amine recovery section and a regeneration tower, wherein a temperature controller for circulating water to a cooling tower for the absorption tower is controlled by a controller of the liquid level of the bottom of the absorption tower to control the temperature of the circulating water, whereby the concentration of amine in the absorbent is regulated.

The temperature controller for circulating water to a cooling tower for the absorption tower is generally a temperature controller, which receives a control signal sent from the controller of the liquid level of the bottom of the absorption tower and changes a temperature set value, and regulates the flow rate by controlling a control valve while detecting temperature information sent from a temperature detector.

In the present invention, the control method using the controller of the liquid level of the bottom of the absorption tower preferably involves sample PI control. In this case, even if a delay exists in the operation result, control can be accomplished properly.

Further, the present invention provides, as another aspect, a system for controlling absorbent at a decarboxylation facility provided with an absorption tower having an amine recovery section and a regeneration tower, wherein the system comprises a controller of the liquid level of the bottom of the absorption tower and temperature controller for circulating water to the washing section of the absorption tower controlled by the controller of the liquid level of the bottom of the absorption tower.

Such a control system comprises, in another embodiment, a controller of the liquid level of the bottom of the absorption tower and a temperature controller for circulating water to a cooling tower for the absorption tower controlled by the controller of the liquid level of the bottom of the absorption tower. Such a control system comprises, in still another embodiment, a controller of the liquid level of the bottom of the absorption tower, a temperature controller for circulating water to the washing section of the absorption tower controlled by the controller of the liquid level of the bottom of the absorption tower, and a temperature controller for circulating water to a cooling tower for the absorption tower controlled by the controller of the liquid level of the bottom of the absorption tower, so that the temperature controller system for the circulating water to the washing section and the temperature controller system for the circulating water to the cooling tower are operated by being switched alternately.

In the present invention, water balance is controlled automatically and the concentration of amine is automatically kept proper. In the embodiment, in which the temperature of the circulating water is controlled, of water content in circulating amine solution, water content lost by accompanying outlet gas is controlled, by which the concentration of amine is regulated. Also, in the embodiment in which the temperature of the circulating water to the cooling tower is controlled, the water content added by accompanying inlet gas, which is one factor that determines the water content in circulating amine solution, is controlled, by which the concentration of amine is regulated.

BRIEF DESCRIPTION OF THE DRAWING

Embodiments in accordance with the present invention will now be described with reference to the accompanying drawings, in which.

DETAILED DESCRIPTION OF THE PREFERRED EMBODIMENT

Embodiments of a method for controlling absorbent at a decarboxylation facility in accordance with the present invention and a system for carrying out this method will now be described in detail.

In the present invention, as carbon dioxide-containing gas to be subjected to decarboxylation treatment (referred to as treatment gas), fuel gas, combustion flue gas, and the like can be cited. The treatment gas may contain moisture, oxygen, and Sox, NOx, COS and other acidic gases. The treatment gas may have an increased pressure, normal pressure, or reduced pressure, and also have a low temperature or a high temperature, having no special restriction. It is preferably combustion flue gas with the normal pressure. The concentration of carbon dioxide in the treatment gas is 1 to 75 vol %, preferably 5 to 20 vol %.

As an amine compound (referred simply to as amine) used in the present invention, alcoholic hydroxyl group-containing primary amines such as monoethanolamine and 2-amino-2-methyl-1-propanol, alcoholic hydroxyl group-containing secondary amines such as diethanolamine and 2-methylaminoethanol, alcoholic hydroxyl group-containing tertiary amines such as triethanolamine and N-methyldiethanolamine, polyethylene polyamines such as ethylenediamine, triethylenediamine, and diethylenetriamine, cyclic amines such as piperazines, piperidines, and pyrrolidines, polyamines such as xylenediamine, amino acids such as methyl aminocarboxylic acid, and the like, and mixtures of these compounds can be cited. These amines are usually used as an aqueous solution of 10 to 70 wt % at a temperature of 0 to 100° C. at the time of absorption and at a temperature of 50 to 150° C. at the time of regeneration. To the absorbent, a carbon dioxide absorption accelerator or a corrosion inhibitor such as basic copper carbonate can be added, and further methanol, polyethylene glycol, sulfolane, and the like can be added as other media.

Figure 1:
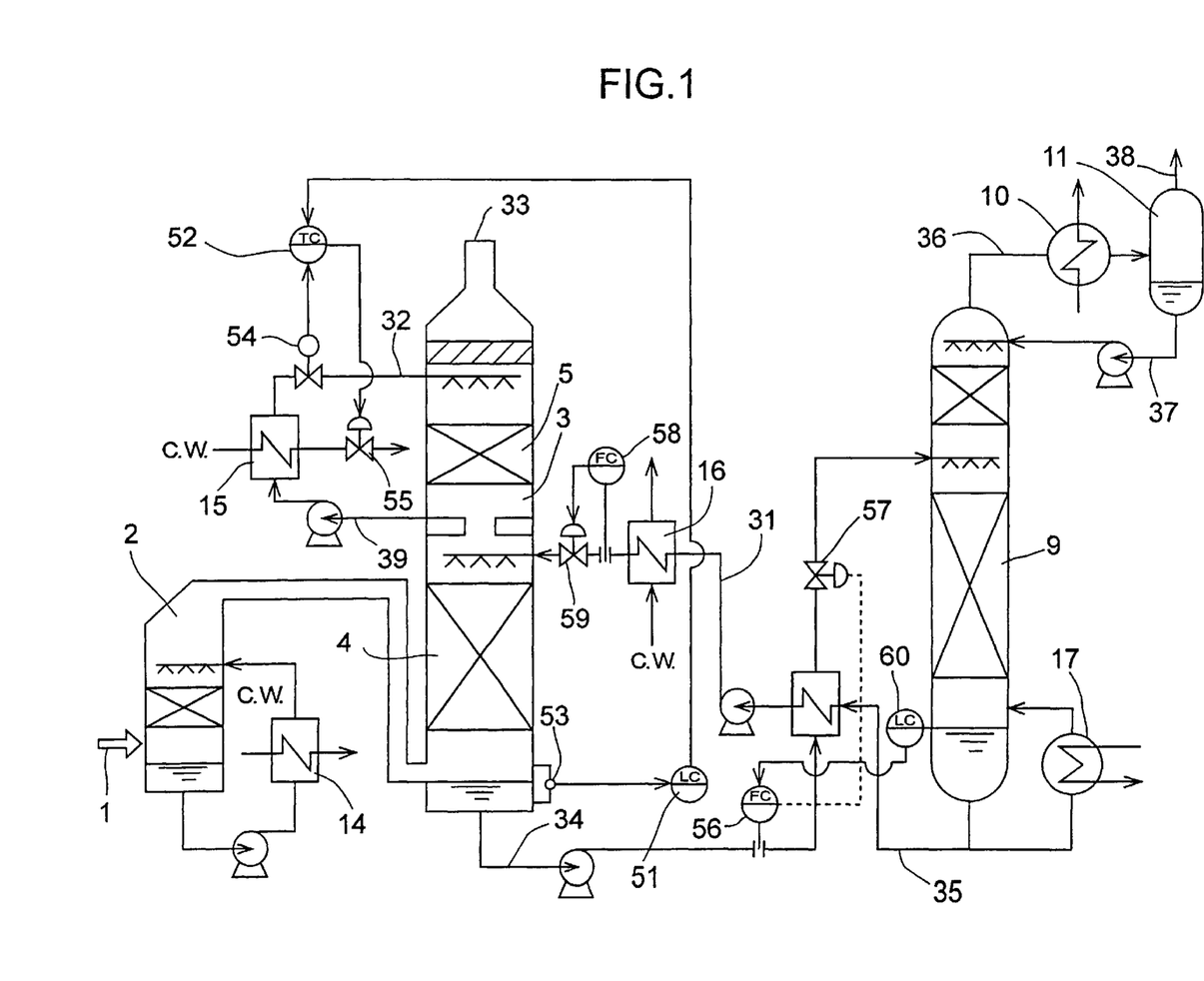
FIG. 1 is a schematic view for explaining one embodiment of a method for controlling absorbent at a decarboxylation facility and a system therefor.

Next, FIG. 1 shows one specific embodiment of a method for controlling absorbent at a decarboxylation facility and a system for carrying out this method.

First, as shown in FIG. 1, treatment gas 1 is cooled to a predetermined temperature as necessary by gas-liquid contact with water in a cooling tower 2. A heat exchanger 14 is an apparatus for cooling cooling water by means of heat exchange water. The treatment gas 1 having been cooled to the predetermined temperature is supplied to a bottom portion of a carbon dioxide absorption tower (referred simply to as an absorption tower) 3, and goes up in the tower having a carbon dioxide absorption section 4 and an amine recovery section 5. Then, the treatment gas 1 is brought into gas-liquid contact with absorbent 31 having passed through a heat exchanger 16 so that carbon dioxide is absorbed. After amine accompanying flue gas is recovered by water washing in the amine recovery section 5, treated flue gas 33 is discharged from the tower top. The gas-liquid contact ratio (L/G; unit: liter/N-m$^3$) in the carbon dioxide absorption tower is 0.5 to 20, and the absorption coefficient of carbon dioxide therein is 50 to 100%. The carbon dioxide absorption section 4 and the amine recovery section 5 of the carbon dioxide absorption tower 3 maybe a packed column or a plate column. Also, the carbon dioxide absorption section and the amine recovery section can be provided with a liquid scattering plate at an appropriate position.

To the amine recovery section 5, amine recovering water 32, which is part of regeneration tower overhead condensate 37, is supplied to decrease the quantity of amine accompanying the treated flue gas 33 discharged from the carbon dioxide absorption tower 3. Also, recovered amine containing water 39, having been heat-exchanged by a heat exchanger 15, is circulated from the lower part to the upper part of the amine recovery section 5.

Absorbent 34 having absorbed carbon dioxide (referred to as loaded absorbent) 34 is discharged from the bottom portion of the absorption tower 3 and supplied to a regeneration tower 9, where it is regenerated into regenerated absorbent 35. A heat exchanger 8 can be provided between the absorption tower 3 and the regeneration tower 9 so that low-temperature loaded absorbent 34 is heated by high-temperature regenerated absorbent 35, whereby heat can be used effectively. The loaded absorbent 34 is supplied to an intermediate portion of the regeneration tower 9, and carbon dioxide 36 is discharged from the tower top together with water vapor. In a portion above the intermediate portion of the regeneration tower 9, a recovery stage is provided to restrain the accompanying of amine. The regeneration can be effected at normal pressure, increased pressure, or reduced pressure. As necessary, the regeneration tower 9 is provided with a heater for heating and circulating the regenerated absorbent or a reboiler 17. The reboiler 17 is heated by steam. For the carbon oxide 36 and water vapor, which have been discharged from the top of the regeneration tower 9, water is condensed in a condenser 10, and the water is separated in a separator 11, by which high-purity carbon dioxide 38 is discharged to the outside of the system. Condensed and separated water (condensate 37) is supplied to the recovery stage of the regeneration tower 9, and the remainder is returned to the amine recovery section 5 as the amine recovering water 32. As described above, some of the condensate 37 is used as the amine recovering water 32.

A flow controller 56 has a function of controlling the flow rate of absorbent by controlling a control valve 57 so that the flow rate of the loaded absorbent is equal to a value corresponding to a correction signal (flow rate setting signal) generated from a liquid level controller 60 so that the liquid level in the regeneration tower is kept at a predetermined value. Also, a flow controller 58 has a function of controlling the flow rate of the absorbent 31 to a predetermined value by controlling a control valve 59.

The following is a description of a control method for keeping the concentration of amine solution constant in the embodiment shown in FIG. 1.

In this embodiment, a temperature controller for the circulating water to the washing section of the absorption tower 3 52 is sample PI controlled by a tower bottom liquid level controller 51, by which the concentration of amine is kept constant. The flow for this control will be described with reference to FIGS. 2 and 3 in addition to FIG. 1.

First, a case where the tower bottom liquid level in the absorption tower 3 is high is assumed. In this case, the concentration of amine solution is low. The causes for this are increased water content in inlet gas of the absorption tower 3, decreased water content in outlet gas of the absorption tower 3, and entrance of water into amine solution system from the outside (FIG. 2).

Figure 2:
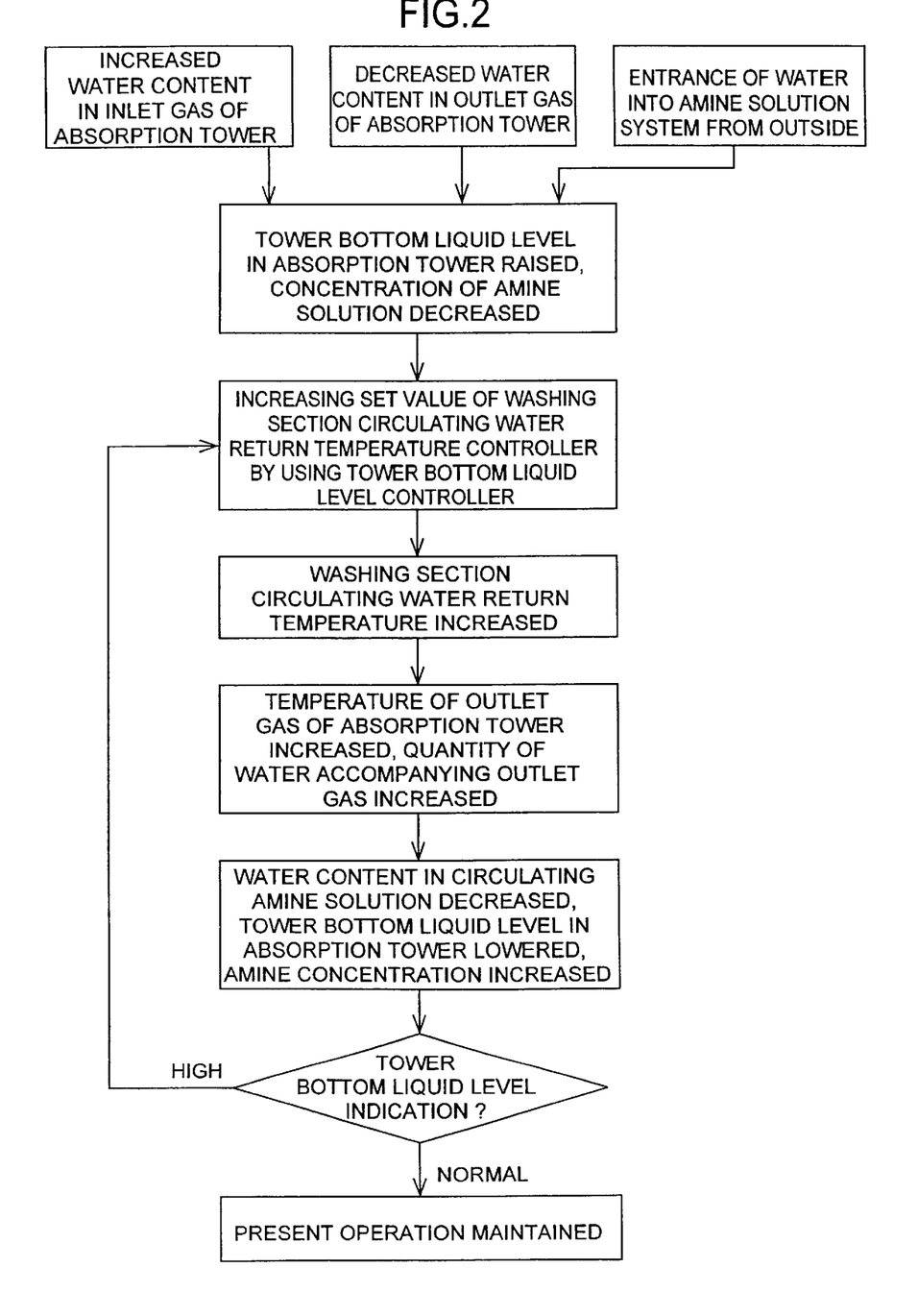
FIG. 2 is a flowchart for explaining a flow for regulating amine concentration in the embodiment shown in FIG. 1.

As shown in FIG. 2, if the tower bottom liquid level controller 51, which receives liquid level information sent from a liquid level detector 53, detects this state, the tower bottom liquid level controller 51 sends a control signal to the temperature controller 52 for the circulating water to the washing section of the absorption tower 3 so as to increase the temperature set value by a certain operating temperature amount. At this time, the temperature is increased by controlling a control valve 55 while detecting temperature information sent from a temperature detector 54. Thereupon, the temperature of the circulating water to the washing section increases, and the temperature of the outlet gas 33 of the absorption tower 3 increases, so that the quantity of water accompanying the outlet gas increases. Also, the water content in circulating amine solution decreases, and the tower bottom liquid level in the absorption tower 3 lowers, so that the concentration of amine increases.

This state is judged in the last part of the flow shown in FIG. 2. If the liquid level is still high, the temperature set value is further increased by a certain operating temperature amount. If the liquid level is normal, the state is maintained. Thus, the normal operating state is maintained.

As described above, in this embodiment, the control carried out by raising the temperature set value by a certain operating temperature amount is accomplished by the above-described sample PI control.

Figure 4:
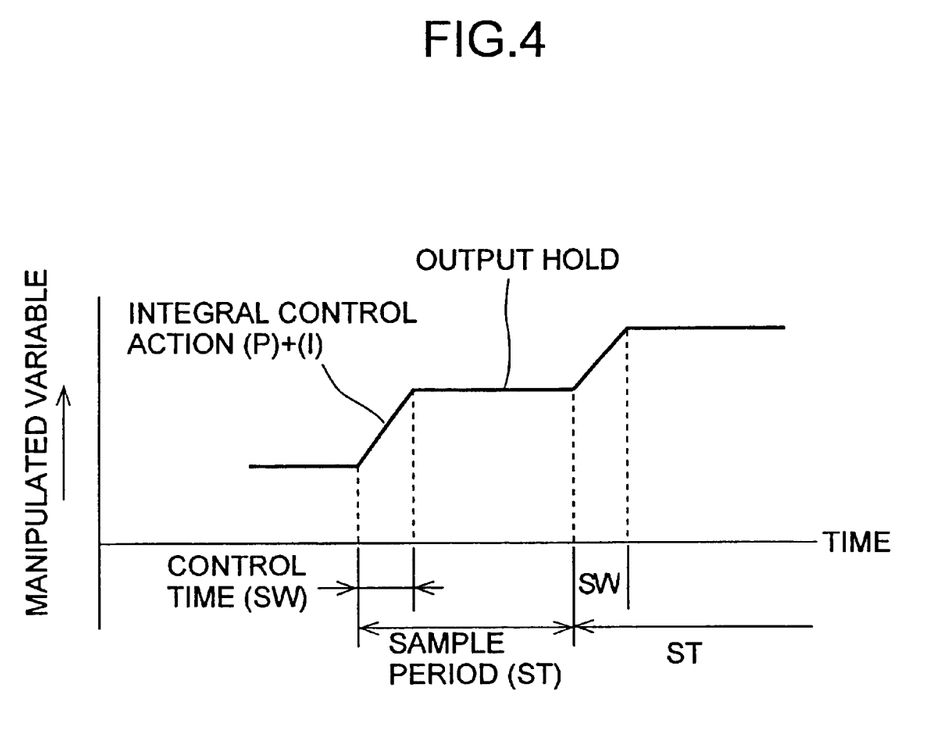
FIG. 4 is control action diagrams for explaining the details of sample PI control.

The method for the sample PI control is described with reference to the control action diagram shown in FIG. 4. PI control is carried out for only control time (SW) at the start of a sample period (ST), and after the control time has elapsed, a manipulated variable (a temperature increased from the temperature set value, specifically the above-described operating temperature) is held (output hold). In other words, control operation is performed only for a short period of time of every sample period. Here, character P denotes proportional control action and I denotes integral control action, and by these actions, proportional plus integral control action (PI control action) is regulated.

The sample period and control time are set appropriately by a trial operation of system or other means. General guidelines for these values are as follows:

$$ST=(L+T_0)\times(2 \text{ to } 3)$$

SW=ST/10

L: dead time $T_0$: delay time constant

From the viewpoint of rise characteristics for decreasing overshoot, the sample period (ST) is preferably longer. However, when the shortest period $T_N$ of main disturbance applied to the process is shorter than ST, the disturbance cannot be controlled. Therefore, $ST \leq T_N/5$ is a preferable setting.

The method for controlling absorbent at a decarboxylation facility in accordance with the present invention is a process having a long length of dead time for which a control result (change of temperature setting) does not appear immediately on the measured value. Thereupon, the inventors made studies earnestly to attain the optimum method. As a result, we found that the temperature controller 52 for the circulating water to the washing section of the absorption tower 3 can be controlled automatically by the tower bottom liquid level controller 51 only when such sample PI control is carried out.

Next, a case where the tower bottom liquid level in the absorption tower 3 is low is assumed. In this case, the concentration of amine solution is high. The causes for this are decreased water content in inlet gas of the absorption tower 3 and increased water content in outlet gas of the absorption tower 3 (FIG. 3).

Figure 3:
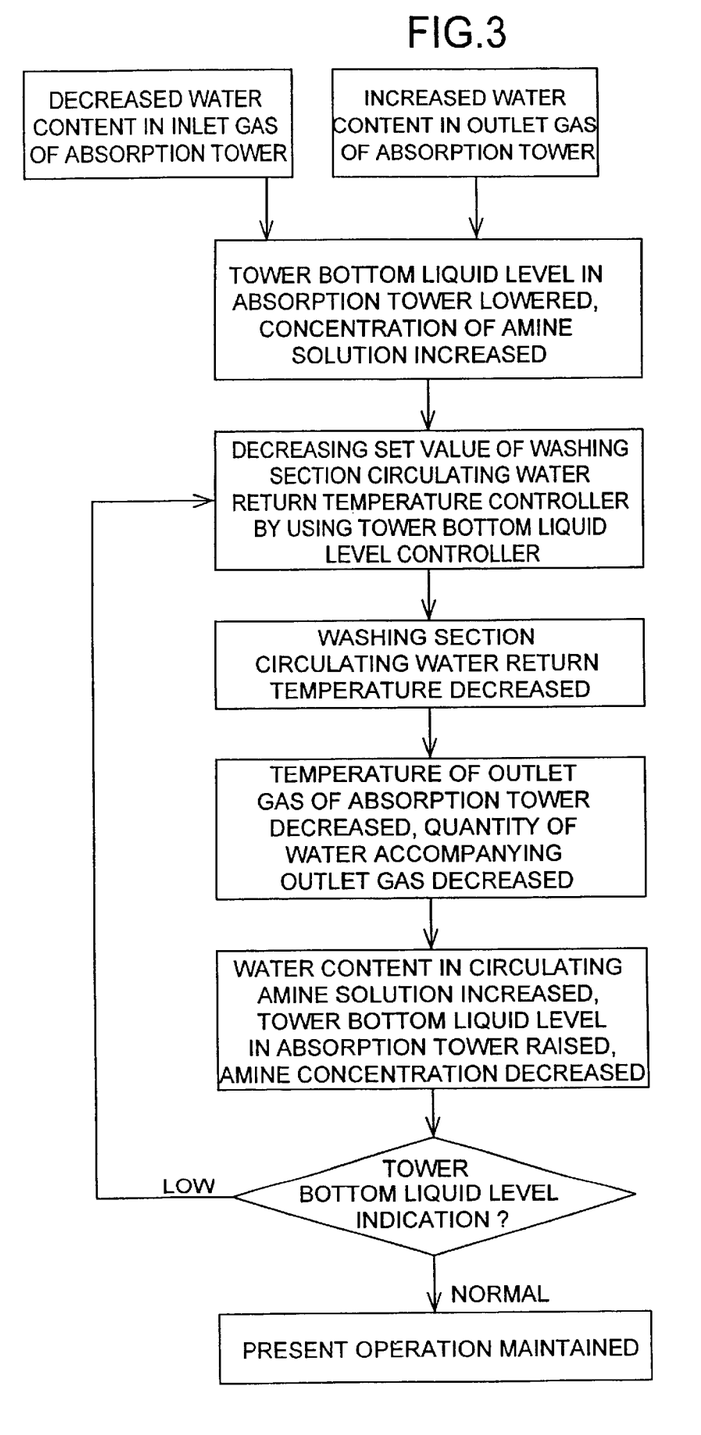
FIG. 3 is another flowchart for explaining a flow for regulating amine concentration in the embodiment shown in FIG. 1.

As shown in FIG. 3, if the tower bottom liquid level controller 51, which receives liquid level information sent from the liquid level detector 53, detects this state, the tower bottom liquid level controller 51 sends a control signal to the temperature controller 52 for the circulating water to the washing section of the absorption tower 3 so as to decrease the temperature set value by a certain operating temperature amount. At this time, the temperature is decreased by controlling the control valve 55 while detecting temperature information sent from the temperature detector 54. Thereupon, the temperature of the circulating water to the washing section decreases, and the temperature of the outlet gas of the absorption tower 3 decreases, so that the quantity of water accompanying the outlet gas decreases. Also, the water content in circulating amine solution increases, and the tower bottom liquid level in the absorption tower 3 rises, so that the concentration of amine decreases.

This state is judged in the last part of the flow shown in FIG. 3. If the liquid level is still low, the temperature set value is further decreased by a certain operating temperature amount. If the liquid level is normal, the state is maintained. Thus, the normal operating state is maintained.

In this case as well, as described above, in this embodiment, the control carried out by lowering the temperature set value by a certain operating temperature amount is accomplished by the above-described sample PI control. The principle of this control is similar to the principle already described with reference to FIG. 4.

Figure 5:
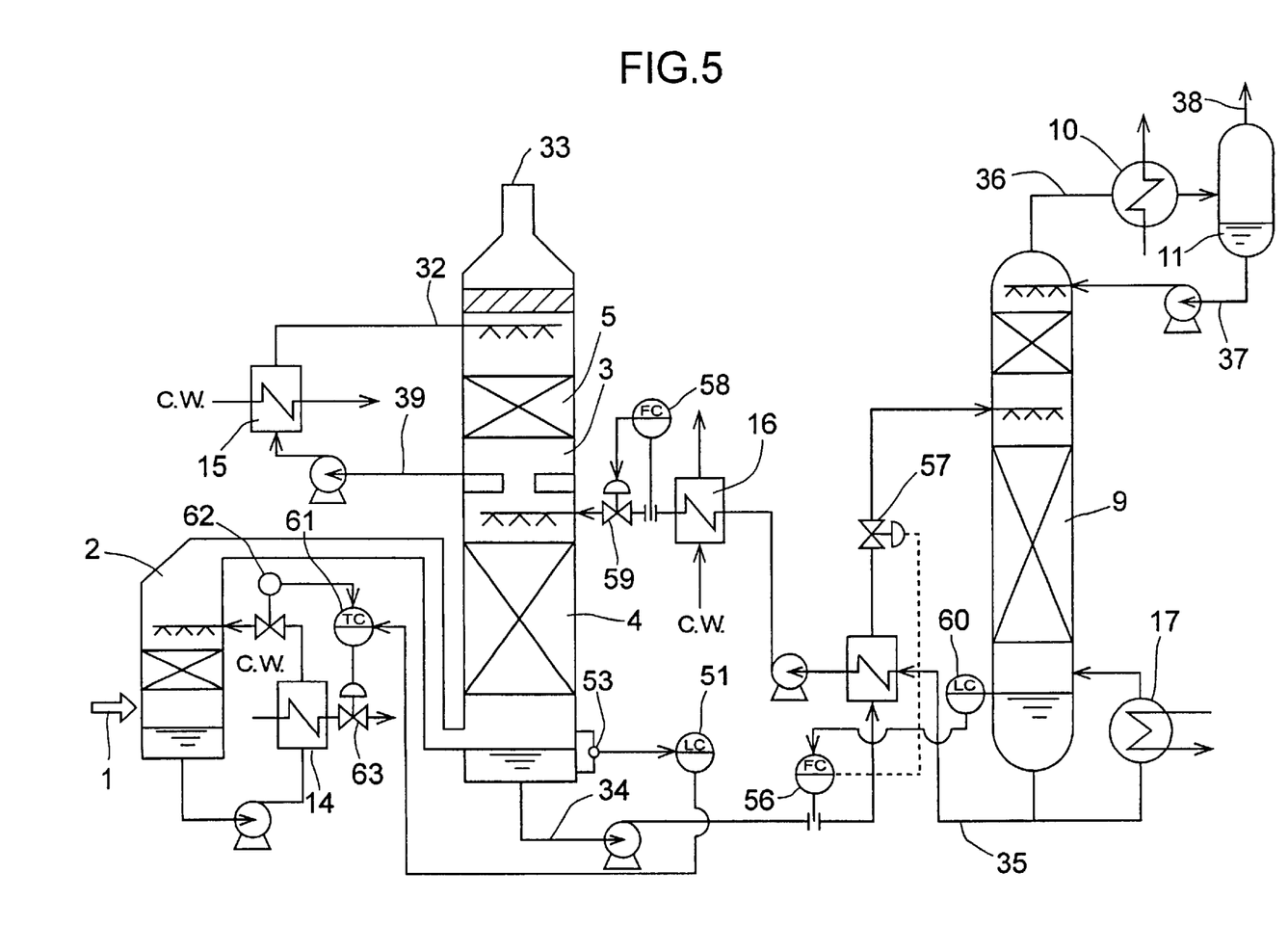
FIG. 5 is a schematic view for explaining another embodiment of a method for controlling absorbent at a decarboxylation facility and a system therefor.

FIG. 5 shows another specific embodiment of a method for controlling absorbent at a decarboxylation facility and a system for carrying out this method. In this embodiment, the elements to which the same reference numeral as that in FIG. 1 is applied have the same configuration and function as those of the elements shown in FIG. 1. Therefore, the explanation of each of the elements is omitted, and a control method for keeping the concentration of amine solution constant in the embodiment shown in FIG. 2 will be described.

In this embodiment, a temperature controller 61 for the circulating water to the cooling tower 2 is sample PI controlled by the tower bottom liquid level controller 51, by which the concentration of amine is kept constant. The flow for this control will be described with reference to FIGS. 6 and 7 in addition to FIG. 5.

First, a case where the tower bottom liquid level in the absorption tower 3 is high is assumed. In this case, the concentration of amine solution is low. The causes for this are increased water content in inlet gas of the absorption tower 3, decreased water content in outlet gas of the absorption tower 3, and entrance of water into amine solution system from the outside (FIG. 6).

Figure 6:
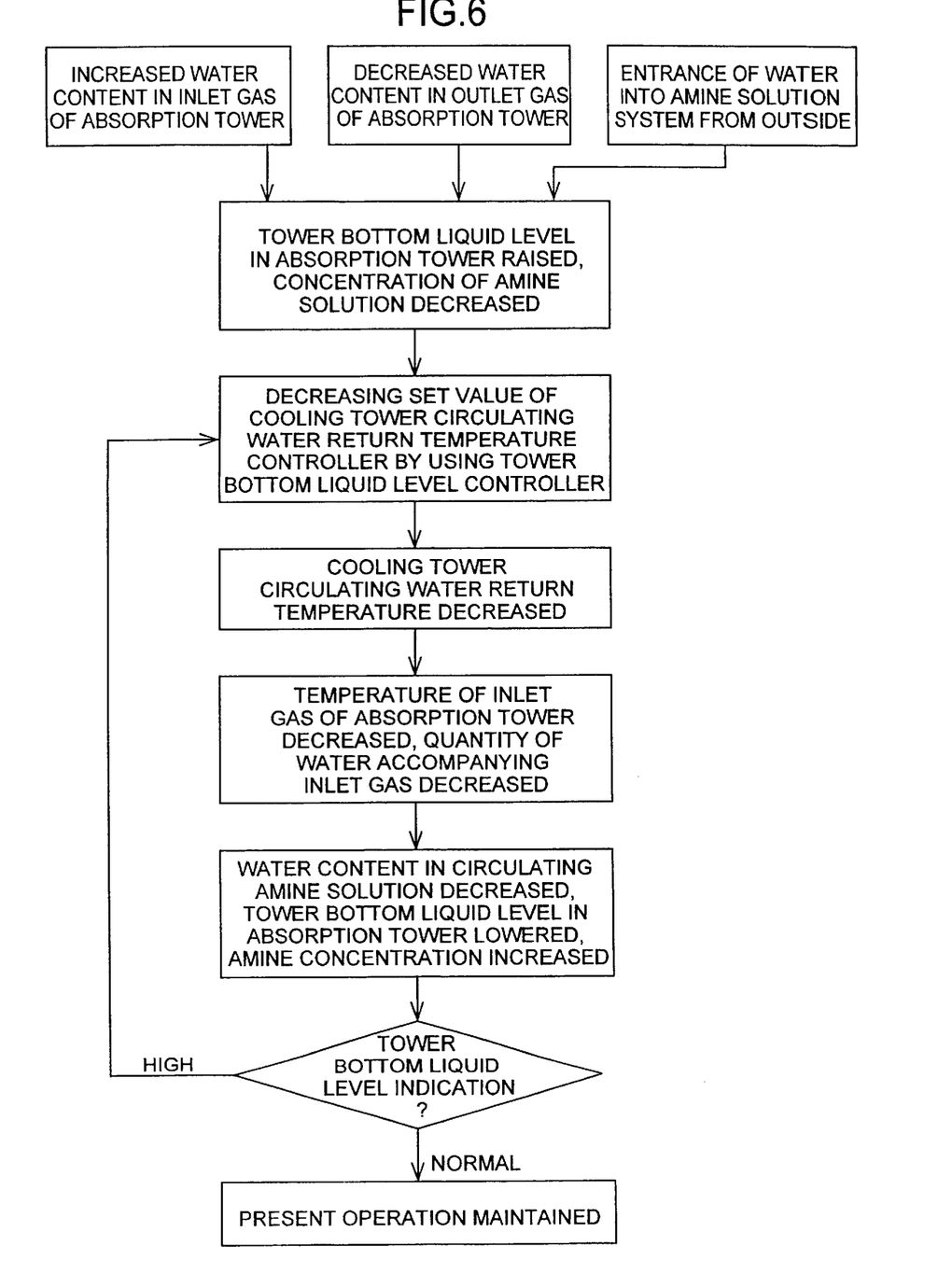
FIG. 6 is a flowchart for explaining a flow for regulating amine concentration in the embodiment shown in FIG. 5.

As shown in FIG. 6, if the tower bottom liquid level controller 51, which receives liquid level information sent from the liquid level detector 53, detects this state, the tower bottom liquid level controller 51 sends a control signal to the temperature controller 61 for the circulating water to the cooling tower 2 so as to decrease the temperature set value by a certain operating temperature amount. At this time, the temperature is decreased by controlling a control valve 63 while detecting temperature information sent from a temperature detector 62. Thereupon, the cooling tower circulating water return temperature decreases, and the temperature of inlet gas of the absorption tower 3 decreases, so that the quantity of water accompanying the inlet gas decreases. Also, the water content in circulating amine solution decreases, and the tower bottom liquid level in the absorption tower 3 lowers, so that the concentration of amine increases.

This state is judged in the last part of the flow shown in FIG. 6. If the liquid level is still high, the temperature set value is further decreased by a certain operating temperature amount. If the liquid level is normal, the state is maintained. Thus, the normal operating state is maintained.

In this case, as described above, in this embodiment, the control carried out by lowering the temperature set value by a certain operating temperature amount is accomplished by the above-described sample PI control. The method for this control is completely the same as that in the embodiment shown in FIG. 1 that has been described with reference to FIG. 4.

The method in accordance with the embodiment shown in FIG. 5 is also a process having a long length of dead time for which a control result (change of temperature setting) does not appear immediately on the measured value. Thereupon, the inventors made studies earnestly to attain the optimum method. As a result, we found that the temperature of the circulating water to the cooling tower can be controlled automatically by the tower bottom liquid level controller 51 only when such sample PI control is carried out.

Next, a case where the tower bottom liquid level in the absorption tower 3 is low is assumed. In this case, the concentration of amine solution is high. The causes for this are decreased water content in inlet gas of the absorption tower 3 and increased water content in outlet gas of the absorption tower 3 (FIG. 7).

Figure 7:
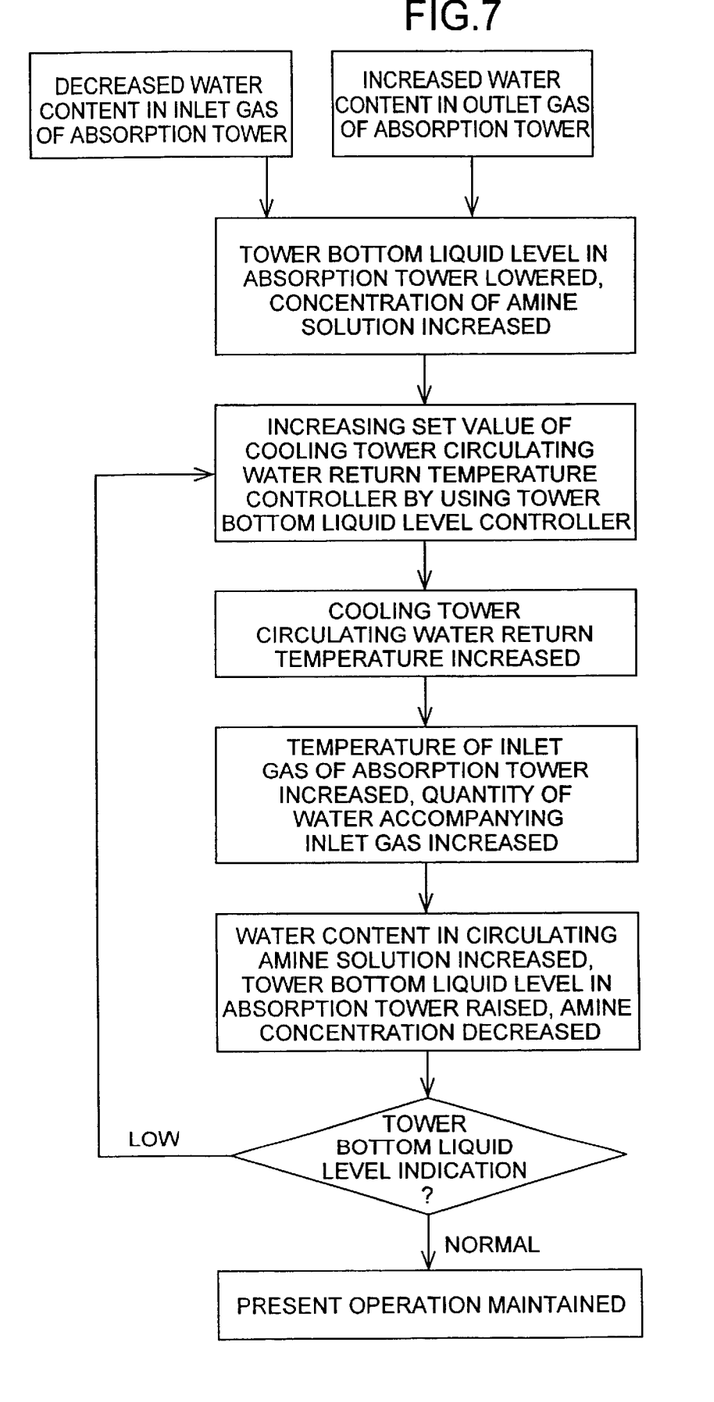
FIG. 7 is another flowchart for explaining a flow for regulating amine concentration in the embodiment shown in FIG. 5.

As shown in FIG. 7, if the tower bottom liquid level controller 51, which receives liquid level information sent from the liquid level detector 53, detects this state, the tower bottom liquid level controller 51 sends a control signal to the temperature controller 61 for the circulating water to the cooling tower 2 so as to increase the temperature set value by a certain operating temperature amount. At this time, the temperature is increased by controlling the control valve 55 while detecting temperature information sent from the temperature detector 54. Thereupon, the absorption tower circulating water return temperature increases, and the temperature of inlet gas of the absorption tower 3 increases, so that the quantity of water accompanying the inlet gas increases. Also, the water content in circulating amine solution increases, and the tower bottom liquid level in the absorption tower 3 rises, so that the concentration of amine decreases.

This state is judged in the last part of the flow shown in FIG. 7. If the liquid level is still low, the temperature set value is further increased by a certain operating temperature amount. If the liquid level is normal, the state is maintained. Thus, the normal operating state is maintained.

In this case as well, as described above, in this embodiment, the control carried out by rising the temperature set value by a certain operating temperature amount is accomplished by the above-described sample PI control. The principle of this control is similar to the principle already described with reference to FIG. 4.

The method for controlling absorbent at a decarboxylation facility in accordance with the present invention and the system for carrying out this method are not limited to the above-described embodiments, and all modifications, changes, and additions in a scope obvious to a person skilled in the art are embraced in the technical scope of the present invention.

In the embodiment described with reference to FIG. 1, the temperature controller for the circulating water to the washing section of the absorption tower 3 is sample PI controlled by the tower bottom liquid level controller 51 to keep the concentration of amine constant. Also, in the embodiment described with reference to FIG. 5, the temperature controller for the circulating water to the cooling tower 2 is sample PI controlled by the tower bottom liquid level controller 51 to keep the concentration of amine constant. The sample PI control system used in these embodiments can also be configured so as to be used for both of the embodiments. In this case, the control system has an advantage that the control system can be operated by switching to either one control system according to the operation purpose of the system for controlling absorbent. Further, in addition to the single control systems as shown in FIGS. 1 and 5, absorption tower control combining both control systems such that when one control is restricted, control is switched to the other control system is also embraced in the scope of the present invention.

As the type of the liquid level detecting means such as the liquid level detector 53 used in the above-described embodiments, a differential pressure type, buoyancy type, capacitance type, ultrasonic type, and other types well known to a person skilled in the art can be used.

Also, as the regulating valve such as the control valve 55 for regulating the flow rate in accordance with the control signal, a ball valve, globe valve, Venturi type valve, reseat valve, and other valves well known to a person skilled in the art can be used.

Further, as the type of the flow rate detecting means for the flow rate regulating means such as the flow controller 56, orifice type, resistor type, fluid vibrating type, float type, vane-wheel type, electromagnetic type, ultrasonic type, and other types well known to a person skilled in the art can be used.

EXAMPLE 1

A control test of absorbent at a decarboxylation facility was conducted by carrying out the sample PI control under the following conditions by using a system in accordance with the embodiment shown in FIG. 1.

Conditions

Quantity of treatment gas: 46,000 $Nm^3/H$

Recovered quantity of $CO_2$: 160 tons/day

Absorbent: KS-1 solution (amine solution)

Figure 8:
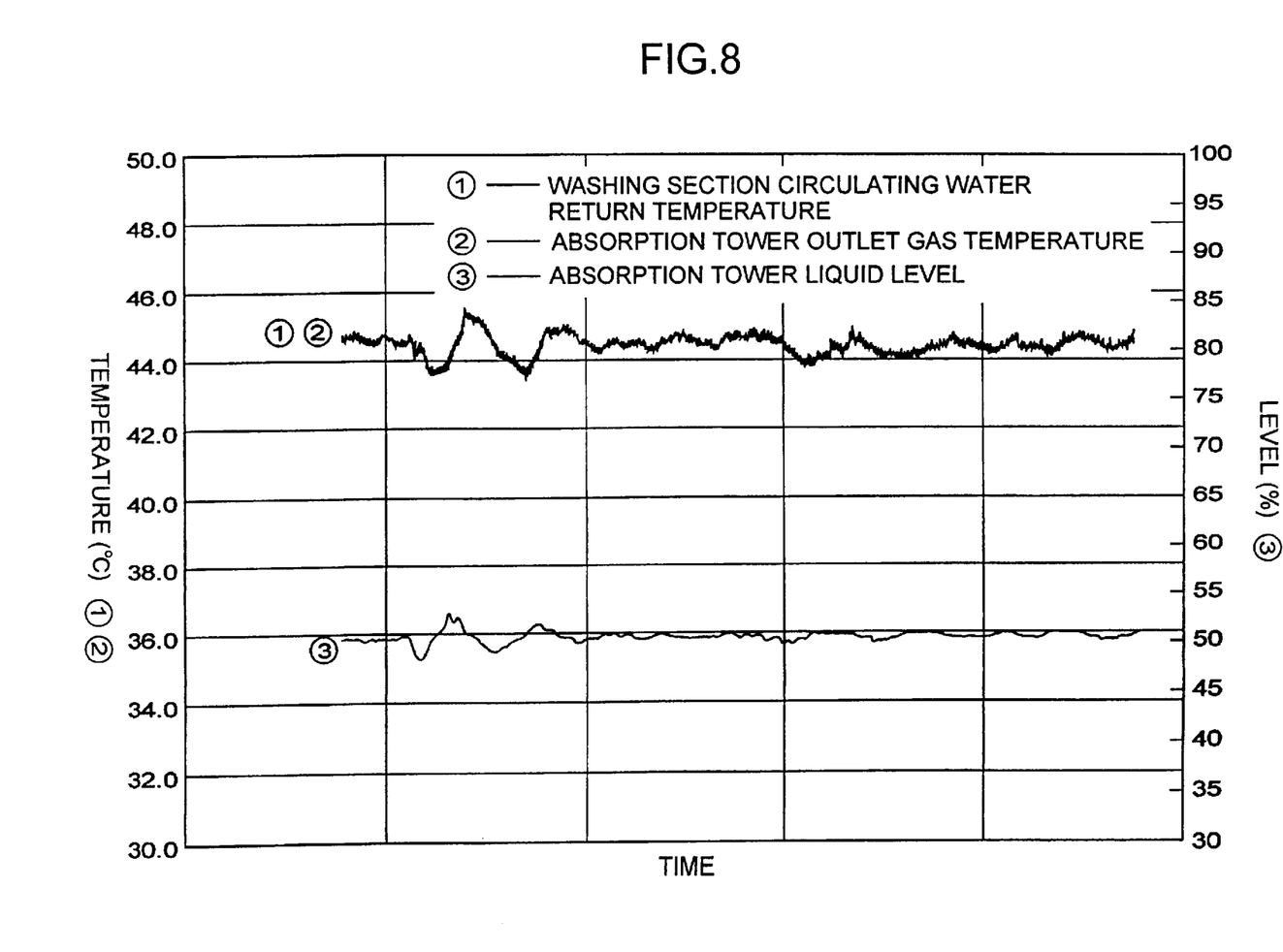
FIG. 8 is a graph showing an operation result of the decarboxylation facility of embodiment 1 in accordance with the present invention.

Result: Automatic control operation of stable liquid level in the absorption tower was performed as shown in FIG. 8.

The disclosure of Japanese Patent Application No.2000-065925 filed on Mar. 10, 2000 including the specification, the claims, the drawings, and the abstract is incorporated herein by reference with its entirety.

What is claimed is:

1. A method for controlling absorbent at a decarboxylation facility with an absorption tower having an amine recovery section and a regeneration tower, the method comprising controlling a temperature controller for controlling a temperature of circulating water forwarded to the amine recovery section of the absorption tower by a controller which controls a liquid level at the bottom of the absorption tower, whereby the concentration of amine in said absorbent is regulated.

2. A method for controlling absorbent at a decarboxylation facility with an absorption tower having an amine recovery section and a regeneration tower, the method comprising controlling a temperature controller for controlling a temperature of circulating water forwarded to a cooling tower connected in an upstream position of the absorption tower by a controller which controls a liquid level at the bottom of the absorption tower, whereby the concentration of amine in said absorbent is regulated.

3. The method for controlling absorbent at a decarboxylation facility according to claim 1 or 2, wherein the controlling said controller for controlling the liquid level at the bottom of the absorption tower includes utilizing sample Proportional plus Integral control.

4. A method for regulating concentration of amine in absorbent at a decarboxylation facility with an absorption tower having an amine recovery section and a regeneration tower, the method comprising:

monitoring a liquid level at the bottom of the absorption tower; and controlling a temperature circulating water forwarded to the amine recovery section of the absorption tower based on the liquid level.

5. The method for regulating concentration of amine in absorbent at a decarboxylation facility according to claim 4 wherein the controlling said controller for controlling the liquid level at the bottom of the absorption tower includes utilizing sample Proportional plus Integral control.

6. A method for regulating concentration of amine in absorbent at a decarboxylation facility with an absorption tower having an amine recovery section and a regeneration tower, the method comprising:

monitoring a liquid level at the bottom of the absorption tower; and controlling a temperature circulating water forwarded to a cooling tower connected in an upstream position of the absorption tower based on the liquid level.

7. The method for regulating concentration of amine in absorbent at a decarboxylation facility according to claim 6, wherein the controlling said controller for controlling the liquid level at the bottom of the absorption tower includes utilizing sample Proportional plus Integral control.

* * * * *

UNITED STATES PATENT AND TRADEMARK OFFICE
CERTIFICATE OF CORRECTION

PATENT NO. : 6,579,508 B2
DATED : June 17, 2003
INVENTOR(S) : Ishida

It is certified that error appears in the above-identified patent and that said Letters Patent is hereby corrected as shown below:

<u>Title page,</u>
Item [75], Inventor, should read:

-- [75]  Inventor:  Kazuo Ishida, Tokyo (JP) --

Signed and Sealed this

Ninth Day of December, 2003

JAMES E. ROGAN
*Director of the United States Patent and Trademark Office*